Jan. 3, 1967 E. P. BARNHART ET AL 3,296,439
PORTABLE COLLAPSIBLE LIGHTPROOF ENCLOSURE HAVING EXTERIORLY HOUSED LIGHT SOURCE
Filed Oct. 7, 1963
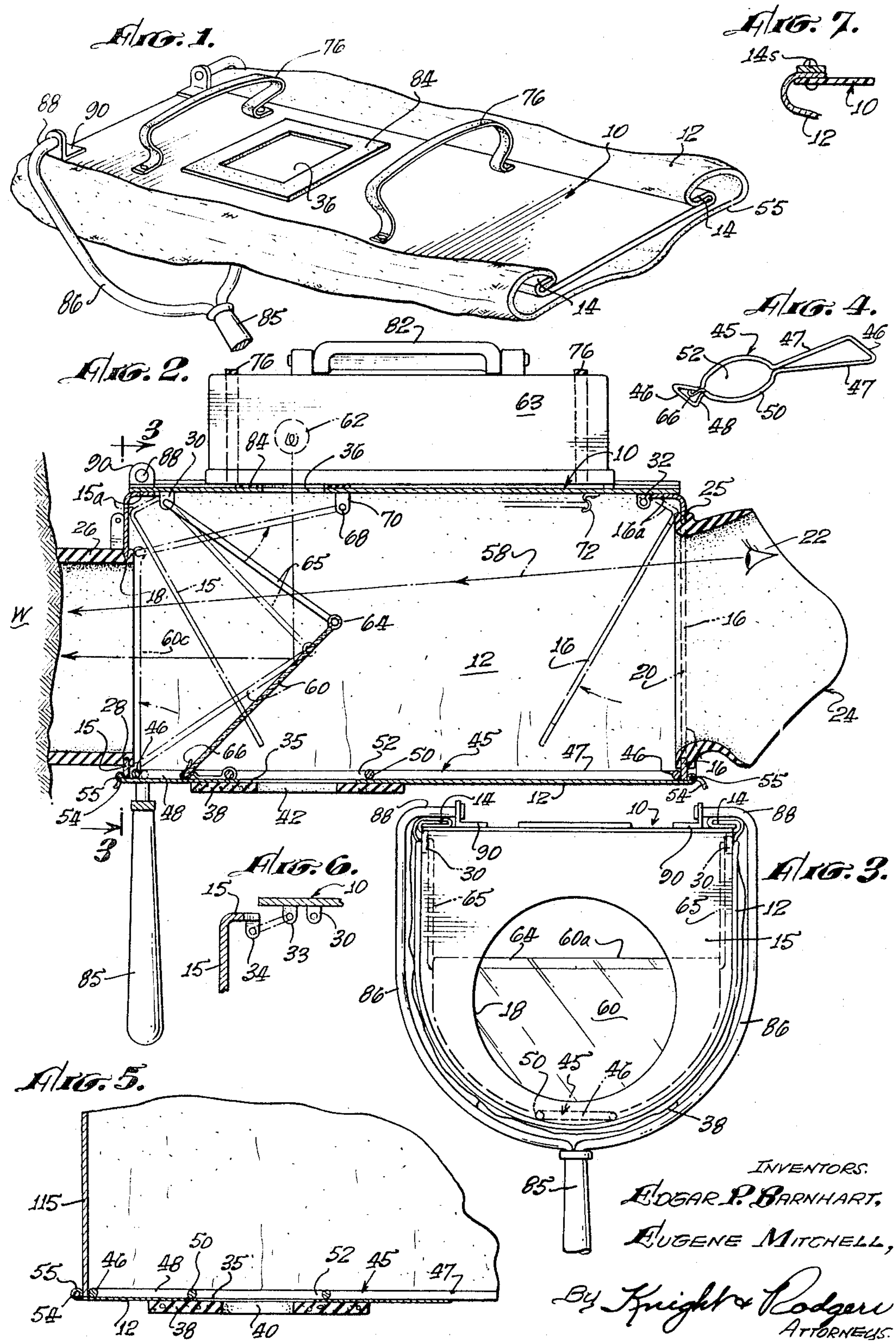
INVENTORS.
EDGAR P. BARNHART,
EUGENE MITCHELL,
BY Knight & Rodgers
ATTORNEYS.

3,296,439
Patented Jan. 3, 1967

3,296,439

PORTABLE COLLAPSIBLE LIGHTPROOF ENCLOSURE HAVING EXTERIORLY HOUSED LIGHT SOURCE

Edgar P. Barnhart, 315 S. Washington Ave., Whittier, Calif. 90602, and Eugene Mitchell, 5222 Lakeview, Yorba Linda, Calif. 92686

Filed Oct. 7, 1963, Ser. No. 314,259
13 Claims. (Cl. 250—78)

This invention involves light-tight collapsible structures or enclosures providing darkened interiors, and is more particularly concerned with a structure for use in the field to examine mineral specimens where found.

As is well known, examination of mineral specimens under ultra-violet light reveals important characteristics not discernible upon examination by ordinary artificial light or daylight, and such examination ordinarily determines retention or rejection of the specimen.

It is, therefore, an important object of this invention to provide a convenient portable device for geologists, "rockhound" hikers and others by which they may examine mineral specimens in the field under ultra-violet light.

A principal object of the invention is to furnish an easily transportable, light-tight, collapsible apparatus which may be readily carried in the packs of hikers and prospectors and be quickly set up for ultra-violet light examination of a mineral specimen whether found loose, or as a part of a wall in a mine shaft or tunnel or in a large rock formation out in the open without the necessity of breaking off a small specimen.

Another object is to provide a specimen-illuminating device which includes a moderately simple, portable, light-tight structure of economical build, and yet which is efficient, versatile and durable and will meet the needs of hikers, rockhounds, prospectors and others for on-the-spot examination of minerals in the field.

A still further object of the invention is to furnish a highly serviceable field device for viewing mineral specimens under ultra-violet light so as to permit immediate discard of worthless specimens and avoid the necessity of carrying them back to headquarters for such examination.

An additional object is to supply a portable viewing structure involving but one rigid main wall and a light-tight collapsible sleeve or housing of fabric or the like carried by such main wall, other parts being loosely arranged for packing between or against the rigid main wall and the collapsed sleeve.

These objects have been achieved in a portable lightproof enclosure embodying the present invention by providing a rigid plate to which the opposite edges of a sheet of light-tight, flexible material are attached, thus forming a collapsible sleeve with one side formed by the rigid plate. The sleeve is held in extended position by a pair of rigid end plates, one at each end of the sleeve. These are movable into and out of the sleeve extending position, to enable the sleeve to be collapsed for carrying when desired. One end plate has a viewing opening provided preferably with means to engage the viewer's face in light-tight relation to exclude outside light. The sleeve has an opening through which the user may pass his hand to hold a mineral specimen inside the enclosure and the plate has an opening through which ultra-violet light is admitted to the enclosure to illuminate the specimen for examination.

Various modifications may be added to improve the utility or convenience of the device. For example, the end plates are conveniently hinged or swingingly carried on the main rigid plate. Also, the other end plate may have an opening surrounded by a soft, flexible hood to allow the enclosure to be used to examine the face of a rock wall, ultra-violet light being reflected onto the wall by a mirror swingingly mounted inside the enclosure.

Other objects of the invention and various features of construction thereof will become apparent to those skilled in the art upon reference to the following specification and accompanying drawing wherein certain embodiments are disclosed which are presently deemed the best representation of the invention.

In the drawing:

FIG. 1 is a top perspective view of the enclosure in collapsed condition for transport.

FIG. 2 is principally a longitudinal vertical section of the apparatus erected and arranged for use, a box containing an ultra-violet light source being shown in elevation mounted in operative position on the top of the apparatus.

FIG. 3 is an elevational view of the left end of the assembled apparatus of FIG. 2, as indicated by the line 3—3 of FIG. 2.

FIG. 4 is a perspective view of a wire positioning and tensioning member employed in the bottom of the collapsible sleeve, as shown in FIG. 2.

FIG. 5 is a fragmentary sectional view illustrating a modification of the enclosure.

FIG. 6 is a fragmentary sectional view of a swinging mounting for one of the end walls.

FIG. 7 is a fragmentary transverse section illustrating a variational manner of fastening the sleeve to the plate.

As the drawing illustrates, the apparatus hereof includes an elongated, rigid, main plate 10, which constitutes both a rigid frame member and a carrying top, and a light-tight, flexible sleeve 12 which is fully collapsible against the main plate 10 as indicated in FIG. 1. The sleeve 12 is produced from a sheet of light-tight fabric, sheet plastic or the like; and two opposite edges of the sleeve are attached to opposite margins of the plate in any suitable manner as by being clamped under rolled-over flange or edge portions 14 of the plate 10, which in the form illustrated is intended to represent a relatively rigid metal plate of ferrous or aluminum alloy or the like. A moulded or stamped plastic sheet may be used instead, if desired. In that case, the sleeve 12 can be clamped at its edge to rigid plate 10 by longitudinally extending clamping strips **14*s* held in place by screws, rivets, bolts or in any other suitable way, as in FIG. 7. This produces a tubular enclosure that is generally cylindrical in shape, whose upper portion is bounded by a flat wall provided by the plate 10**.

The two ends of the enclosure are each formed by one of two opposed end wall members of rigid material which may be similar to that used for the main plate 10. The left end wall member 15 is shown in elevation in FIG. 3. This is considered to be the front end of the housing. The right end wall member 16 is considered to be the rear end; and it is similar to the member 15 in size and shape. In the form of FIGS. 2 and 3, the left end wall member 15 is shown as having a circular observation opening 18, but in FIG. 5 a modified front end wall member 115 is shown as a solid plate without the opening 18, as more fully described hereinbelow. However, the rear or right end wall member 16 is provided, in either event, with a view opening 20 through which a viewer looks to observe a specimen, with his eyes approximately in the position indicated at 22, as also more fully described below.

For the purpose of cushioning the viewer's head and face around his eyes and of excluding outside light, the opening 20 is fitted with a removable, light-tight rubber or plastic foam face piece, as generally indicated at 24. This face piece may be similar to face pieces commonly used on skin-divers' masks to exclude water; and it is easily deformable to conform to the shape of the user's face, hugging it closely to exclude outside light. As shown at 25, face piece 24 is molded with a peripheral groove which faces radially outward to engage over the edge of the plate 16 around the opening 20.

When the front end plate member 15 with the opening 18 is used, a cylindrical hood 26 of soft sponge rubber or plastic foam is mounted on wall 15 to be pressed in light-tight relation against rock wall W which is the specimen to be viewed. The inner end of the hood 26 is provided with a radially outwardly facing peripheral groove 28 to fit removably over the adjacent edge portions of the plate 15 around the opening 18. With this arrangement the viewer at 22 may look entirely through the sleeve 12 and hood 26 to the rock wall W and examine the latter by reason of ultra-violet illumination, as presently to be described.

The end walls or plates 15 and 16 may be movably mounted in the ends of the sleeve 12 either as indicated in FIG. 2 or as indicated in FIG. 6. The only essential difference is that, with the form of FIG. 2, when the lower ends of the plates are pushed inwardly into their broken line positions they are free either to be removed from the sleeve 12 allowing the latter to be collapsed or to be laid within the sleeve when collapsed; whereas with the form of FIG. 6, the plates 15 and 16 are pivoted and their swinging action may be continued upward into positions generally paralleling the rigid main plate 10, as further described later herein.

For either mounting just described, the top portion of each plate 15 and 16 is provided with an inwardly directed flat flange **15*a* or 16*a* respectively which fits under and against the adjacent end portion of the rigid main plate 10 when the plates are in the erected position perpendicular to rigid wall 10. In the form of FIG. 2, inward movement of the flange 15*a* is limited by a pair of transversely spaced ears 30 which act as stops, and the inward movement of the flange 16*a* is limited by a similar pair of ears 32 which are spaced apart transversely of the enclosure and also act as stops. These ears 30 and 32 are affixed to and depend from the underside of the main plate 10. The ears 30 perform an additional function presently to be described. In the form of FIG. 6, the under side of the plate 10 carries an additional ear 33 forward of each ear 30, and the innermost portion of the flange 15*a* carries integral ears 34 to be moved into position alongside the ears 33, these ears 33 and 34 receiving pivot mounting pins, not shown, pivotally connecting ears 33 and 34. A like construction may be provided for the flange 16*a* if such an arrangement is to be employed at both ends of the enclosure. Thus, the plates 15 and 16 may be either removably mounted in operative position, or hinged to plate 10** in operative position.

From the above description it will be evident, without further illustration, that any other suitable hinge means, such as a piece of flexible fabric, synthetic plastic or leather may be employed to hingedly connect end walls 15 and 16 to plate 10. It is also within the scope of the invention to make plate 10 and end walls 15 and 16 integral with each other, as by molding.

Where the solid plate 115 of FIG. 5 is to be used, it also may be mounted either as the plate 15 is mounted in FIG. 2 to slip into position, or on a hinge or pivots, as in FIG. 6 to swing to and from operative position. Especially, when the solid plate 115 is used, it is desired to provide a hand hole as indicated at 35 in the bottom of the sleeve 12, as seen in both FIGS. 2 and 5, opposite a light admitting aperture 36 in the main plate 10. In this case, a soft, pliable plastic foam or sponge rubber cuff 38 is mounted on the sleeve and is provided with a passage 40 to pass a viewer's hand holding a specimen. In the case of the structure of FIG. 2, however, there should be merely a narrow, self-closing slit 42 in the cuff 38 in order to close and exclude light when a wall W is being viewed through the cylindrical wall-contacting hood 26.

In order to position properly the lower portions of the end plates 15 and 16, and to tension the bottom portion of the sleeve 12 and thereby properly dispose the cuff 38, a demountable wire expander or sleeve tensioning member 45, shown in FIG. 4, is used. This expander 45 includes at opposite ends short, parallel crossbars 46 integrally connected by long legs 47 and short legs 48 with curved middle sections 50 which define an elliptical or round passage 52 to be disposed around and above the hand hole 35 in the sleeve 12. When the end plates 15 and 16 are in operative position, the expander 45 is inserted into the sleeve through the view opening 20 and the crossbars 46 are positioned against the inside face of the lower portion of each of the end plates 15 and 16 in a manner tending to spread apart the latter.

To limit outward movement of the lower ends of the end plates, drawstrings 54 are provided in hems or loops 55 formed in the extremities of the sleeve 12 adjoining the end plates. When the end plates 15 and 16 have been positioned to extend the sleeve, as in FIG. 2, the drawstrings 54 are pulled to pucker the hems 55 around the outer edges of the plates 15 and 16 and retain the lower ends of the latter in required positions. The ends of the drawstrings may be secured as by tying them together before or after placing the expander 45 between the end plates, as seems appropriate at the time.

In using the structure of FIG. 2 to view a wall specimen W along the sight line 58 from the position 22 and through the cylindrical wall-contacting hood 26, a mirror 60 is employed. This mirror 60, which desirably may be a polished metal plate, is disposed beneath the light aperture 36 at an appropriate angle for reflection of ultra-violet rays passing through the light aperture 36 from an overlying light source 62, in a light box 63, so that the reflected light rays impinge upon the wall specimen W. For this purpose, the mirror 60 presents an upper horizontal edge **60*a* (FIG. 3) which is disposed adequately below the line of sight 58 to permit proper viewing of the wall over the mirror. To position it, the top of the mirror 60 is rolled to form a bead 64 for receiving portions of a support such as bail 65 whose side arms extend upward, as best shown in FIG. 2, to the previously mentioned depending ears 30. These ears 30 are provided with holes receiving short laterally offset extremities of the arms of the bail 65** which may be removably snapped into position in these holes and there retained by reason of spring characteristics of the bail.

The lower end of the mirror 60 may be removably positioned by a hook 66 located adjacent the forward end of the positioning wire expander 45 and desirably attached to it somewhat as indicated. Or, when desired, the lower end of the mirror 60 may bear against the lower inner wall of the adjacent end wall 15 at the adjacent lower inner edge of the yielding cylindrical viewing section 26. In such case, the dimensions of the mirror may be adjusted, if required, to maintain the angle of incidence of the light rays; or, because of the changed mirror angle, the area of illumination may be raised relative to that indicated in FIG. 2.

In order that the collapsible structure of FIG. 2 may be used not only for viewing a wall specimen W over the top of the mirror 60 and through the yielding contact section 26, but also for viewing a specimen held in the viewer's hand inserted through slit 42 in cuff 38 and through the opening 35 in sleeve 12, provision is made for moving the mirror 60 to serve as a closure for opening 18 in the end plate 15 and the inner end of the passage through the cylindrical yielding contact section 26. For this purpose, the offset extremities of the spring arms of the bail 65 are removed from their bearing holes in the ears 30, the mirror 60 detached at its lower end from the clip 66, the top of the mirror lowered for swinging the bail 65 rearward, the mirror 60 shifted to the vertical position **60*c*, indicated in dot-dash lines, against the inner rim of the sealing section 26**, and the bail extremities then swing up and snap into bearing holes 68 in a second pair of spring ears 70 depending from the main plate 10 like the ears 30. The lower end of the end plate 15 is retained in place against hood 26 by being pressed down behind the adjacent crossbar 46 of the expander 45 which yields to permit this disposition. The apparatus is now ready for presentation of a mineral specimen into the interior of the sleeve 12 for examination under the ultra-violet rays entering through the light aperture 36. These operations of adjusting the mirror 60 may be readily effected through the face piece 24 at the view opening 20 in the rearward end plate 16 and through the forward contact section 26 and opening 18 in the forward end plate 15.

When it is desired to collapse the sleeve structure 12, the mirror 60 and its bail 65 may be entirely removed; or the bail 65 may be mounted in the ears 30 as shown in full lines in FIG. 2, the lower end of the mirror moved up to engage against a curved spring clip 72 on the under side of the main plate 10. The top of the mirror 60 and the attached portion of the bail 65 are then moved upward as partially indicated in broken lines and the bail snapped into position between the spring ears 70 which retain these parts.

To complete the collapse of the sleeve 12, the drawstrings 54 are loosened and the end plates 15 and 16 slipped out of their closing positions. The yielding face piece 24 and cylindrical section 26 are removed from their associated end plates, especially if the latter are not removed from inside the sleeve. These parts and the released expander 45 may then be stored in the sleeve 12 and the whole collapsed to a condition somewhat as represented in FIG. 1.

The above mentioned light box 63, disposed on the top of the main plate 10, is preferably attached to the plate; and this may be done in any suitable and convenient manner. As an example of suitable attaching means, the top plate 10 has attached to it two resilient loops 76, which may be rubber bands or coil springs or the like in actuality. These have the advantage of being adapted to various sizes and shapes of light boxes 63; and are designed to pass over the box as shown to hold the box and plate 10 together.

The top of the light box 63 is shown provided with a handle structure 82 for carrying the light box; and this handle also serves for carrying the entire assemblage without detachment of the light box 63 from the main plate 10. To insure a good light seal at the light aperture 36 in the plate 10, a yieldable light-tight gasket 84 is secured to the top of the plate 10 around the light aperture 36. Bands 76 press the box 63 against the resilient gasket to exclude light at this point.

To facilitate manipulation of the entire apparatus when in operative relationship, a swinging handle 85 is employed which is mounted on a bail 86 whose outer ends are pivotally mounted by means of appropriate mounting pins 88 received in supporting brackets 90 fixed on the forward top surface of the main plate 10. When viewing as indicated in FIG. 2, this handle 85 assists in positioning the assembled device in the viewing position. For storage or transport, it swings toward a collapsing position as represented in FIG. 1.

It will be apparent from the above description that various changes in the detailed structure and arrangement of the parts of the portable enclosure may be made without departing from the scope of the present invention. Accordingly, it is to be understood that the description above is considered to be illustrative of, rather than limitative upon, the invention as defined by the appended claims.

We claim:

1. In a portable light-tight viewing structure, the combination comprising:
- a rigid main plate;
- a light-tight, flexible and collapsible sleeve secured to opposite edges of said plate in light-tight relation, the sleeve being open at its opposite ends;
- end plates pivotally mounted in the main plate at spaced positions and swingable relative to the main plate to be disposed in light-tight relation in said opposite ends of said sleeve to extend the sleeve to form a viewing space inside the sleeve, one of said end plates being provided with a view opening to be positioned at a viewer's face in light-tight relation thereto;
- access means providing viewing access for an object to be viewed interiorly of the structure;
- and means provided on said main plate to receive a source of light and to transmit said light to the interior of said structure.

2. A structure as in claim 1 that also includes:
- a device removably mounted on and exteriorly of said main plate and containing said source of light, and having a light emitting opening;
- and said plate having an aperture in registration with said light emitting opening for passing light into said sleeve.

3. A structure as in claim 1 wherein said access means for providing viewing access includes an opening in a wall portion of said structure and resilient light-excluding means about said opening.

4. A structure as in claim 1 wherein said end plates are movable to positions substantially parallel to said name plate thereby providing for collapse of said sleeve.

5. A structure as in claim 1 wherein said other end plate has an opening to be placed opposite an external object to be viewed in light received from said viewing space and means engaging such external object in light-tight relation to exclude ambient light at such opening from the viewing space.

6. A structure as in claim 5 that also includes:
- a mirror in said sleeve spaced from said last mentioned opening and in position to reflect light from said source on said object opposite the opening in said other end plate.

7. A structure as in claim 6 wherein said mirror is movable between said reflecting position and a second position closing said opening in said other end plate, and means are provided for positioning the mirror in a selected one of said positions.

8. A structure as in claim 5 that also includes:
- a bail structure connected to said mirror and to said main plate alternatively to position the mirror adjacent said other end plate and spaced downwardly from said main plate.

9. A structure as in claim 1 also including a removable spreading means disposed opposite said main plate and engaging portions of said end plates at position removed from the main plate for holding the end plates spread apart and extending said sleeve.

10. A structure as in claim 1 including means for constricting the ends of said sleeve exteriorly of said end plates.

11. In a portable collapsible light-tight structure, the combination comprising:
- a rigid main plate of rectangular shape;
- a light-tight, flexible fabric sleeve below said main plate and connected thereto at two opposite edges thereof in light-tight relation, the sleeve being open at opposite ends;
- end plates disposed in light-tight relation at the two opposite open ends of said sleeve holding the sleeve in extended position to define a viewing space inside the sleeve, one of said end plates having a viewing opening;
- a source of light detachably mounted on said main plate outside the sleeve, the main plate having an aperture communicating with said light source for passing light into the viewing space within said sleeve;
- and means in said sleeve opposite said aperture in the main plate providing access for insertion of a specimen to be viewed from said view opening, the last mentioned means including a soft, elastic cuff-like closure adapted to pass a viewer's hand while excluding ambient light from the viewing space.

12. A portable light-tight viewing structure comprising in combination:

a rigid main plate;

a light-tight flexible and collapsible sleeve engaging the plate at two opposite longitudinal edges to define interiorly of the extended sleeve a viewing space;

a pair of end plates pivotally mounted on the main plate at spaced positions adjacent the open end of the sleeve and swingable relative to the main plate to extend outwardly away from the main plate to extend the sleeve, each of said end plates having an opening therein; one of said openings being a viewing opening;

a soft, easily deformable member of annular shape mounted on one end plate around the opening therein to engage an object externally of the sleeve in light-tight relation;

a light source detachably mounted on the main plate exteriorly of the viewing space, the main plate having an opening admitting light from said source into the viewing chamber;

and mirror-means in the chamber reflecting light from said source in the direction of said one end plate and onto said object within the boundary of said annular member;

said mirror being disposed to permit a viewer to see past the mirror to view the object illuminated by said light at the one end of the chamber.

13. A structure as in claim 12 in which also includes:

access means in the sleeve for insertion of a specimen to be observed in the viewing space;

and means mounting the mirror means in position to close the opening in said one end plate and permit unobstructed sight of said specimen from the viewing opening.

References Cited by the Examiner

UNITED STATES PATENTS

| | | | |
|---|---|---|---|
| 883,653 | 3/1908 | Levison | 250—78 |
| 922,958 | 5/1909 | Ryan | 240—36 |
| 984,520 | 2/1911 | Campbell | 250—78 |
| 2,110,310 | 3/1938 | Shayes | 250—78 |
| 2,537,373 | 1/1951 | Rosenberg | 250—78 |
| 2,874,302 | 2/1958 | Mallory | 250—78 |

RALPH G. NILSON, *Primary Examiner.*

JAMES W. LAWRENCE, *Examiner.*

S. ELBAUM, *Assistant Examiner.*